Sept. 19, 1950     C. G. SEYFERTH     2,523,152
SUPPORT FOR SEMITRAILERS
Filed June 14, 1945     5 Sheets-Sheet 2
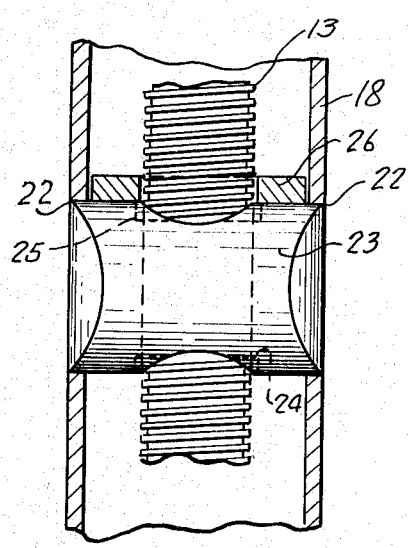
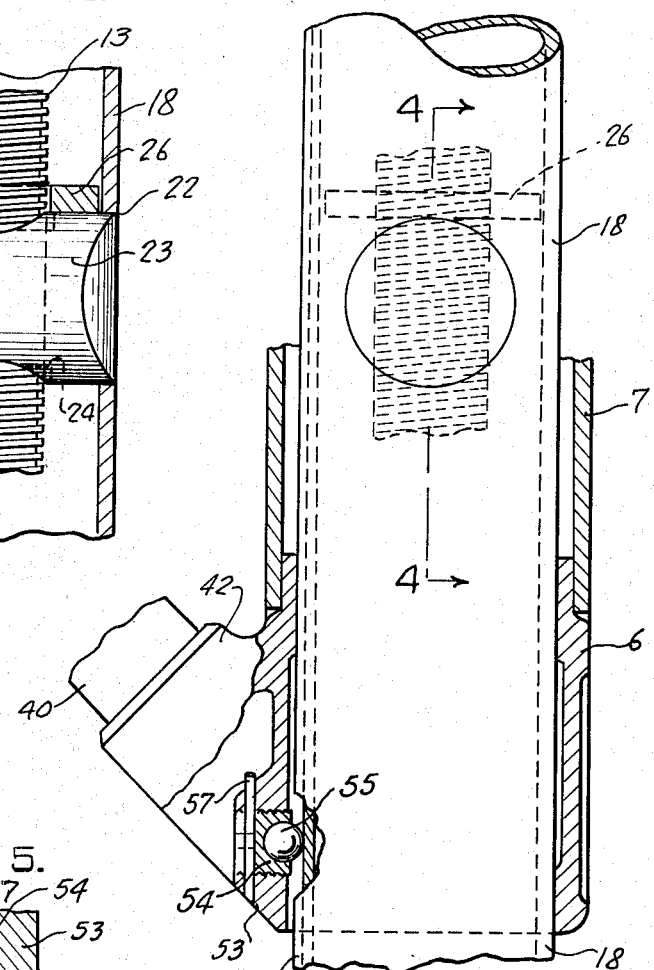
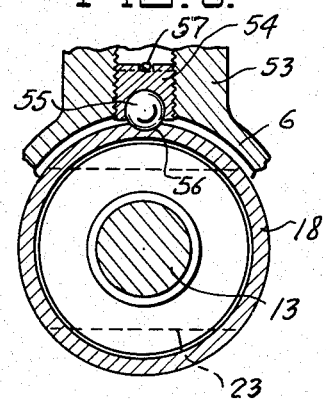
INVENTOR.
Carl G. Seyferth
BY
Barnes, Kisselle, Laughlin & Raisch
Attorneys Sept. 19, 1950  C. G. SEYFERTH  2,523,152
SUPPORT FOR SEMITRAILERS
Filed June 14, 1945  5 Sheets-Sheet 3
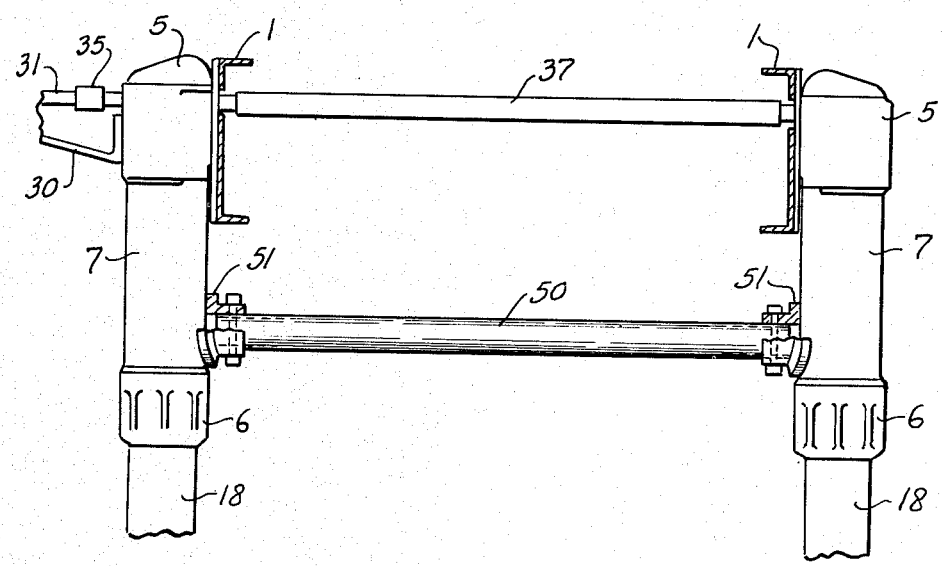
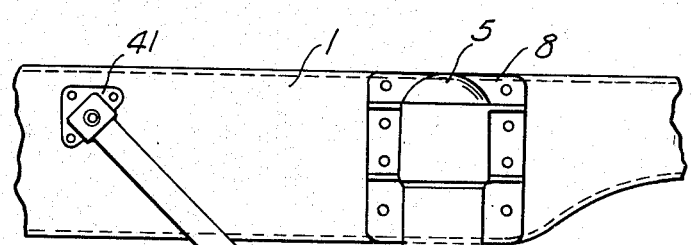
INVENTOR.
Carl G. Seyferth
BY
Barnes, Kisselle, Laughlin & Raisch
Attorneys Sept. 19, 1950 C. G. SEYFERTH 2,523,152
SUPPORT FOR SEMITRAILERS
Filed June 14, 1945 5 Sheets-Sheet 4

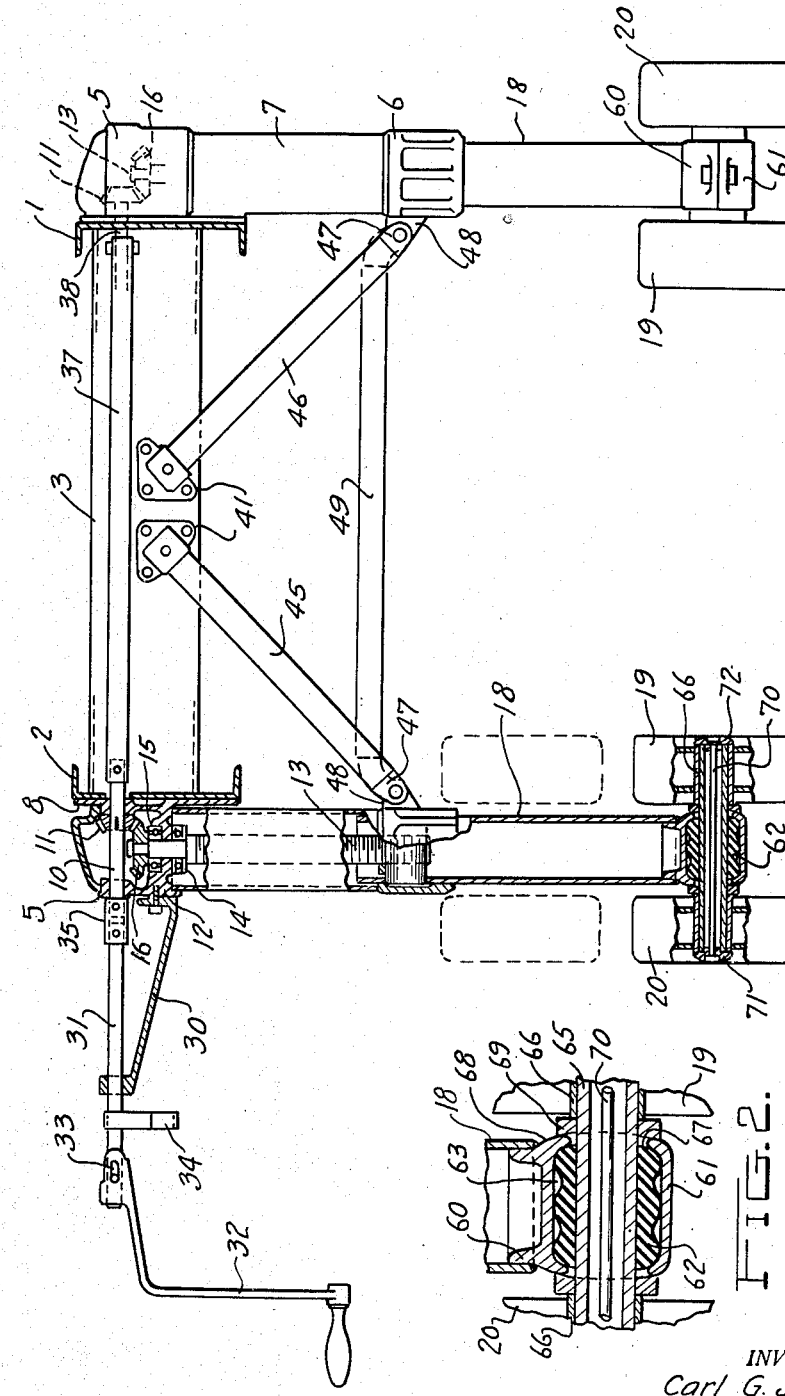

INVENTOR.
Carl G. Seyferth
BY
Barnes, Kisselle, Laughlin & Raisch
Attorneys

Sept. 19, 1950 C. G. SEYFERTH 2,523,152
SUPPORT FOR SEMITRAILERS
Filed June 14, 1945 5 Sheets-Sheet 5
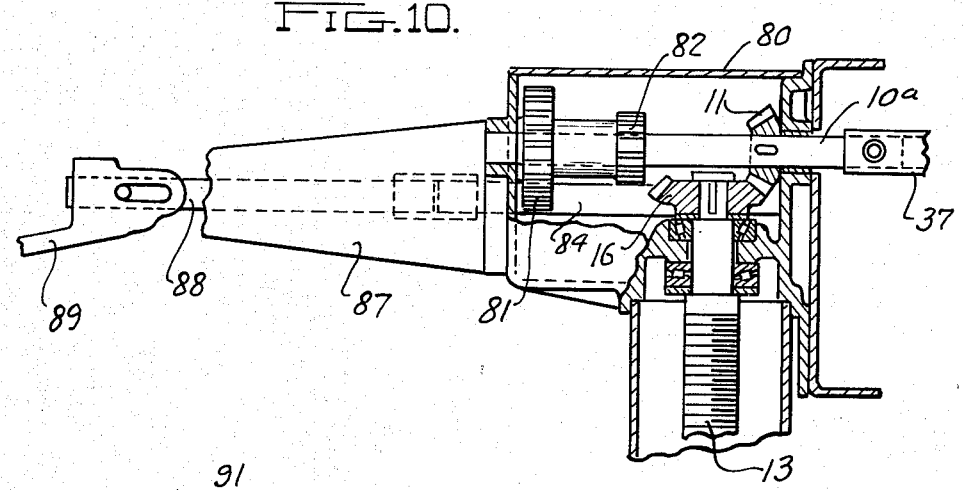
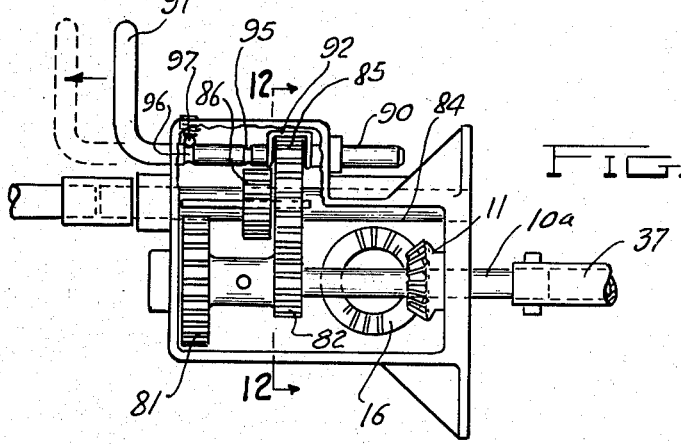
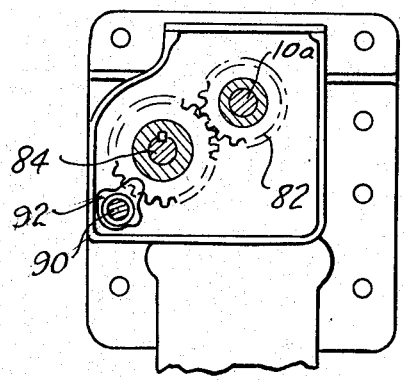
INVENTOR.
Carl G. Seyferth Patented Sept. 19, 1950

2,523,152

UNITED STATES PATENT OFFICE 2,523,152

SUPPORT FOR SEMITRAILERS

Carl G. Seyferth, Muskegon, Mich., assignor to West Michigan Steel Foundry Company, Muskegon, Mich., a corporation of Michigan Application June 14, 1945, Serial No. 599,355

6 Claims. (Cl. 254—86)

This invention relates to supports for semi-trailers.

As is well known to those versed in the art the semi-trailer is a vehicle having road wheels at its rear end and which overlies and rests upon a tractor at its forward end. An articulated joint, such as a fifth wheel establishes the connection between the tractor and the forward end of the semi-trailer. Quite a large number of trailer supports have been heretofore proposed, some being of an automatic nature and others being of the manually controlled type.

Among the general objects of the invention is the provision of an improved support structure which is highly versatile and which is so constructed and arranged that a support may be specially designed for a particular job, yet without departing from standardization of structure and of manufacture. There are various types of semi-trailers including, low bed trailers designed for hauling such things as machinery and the like; a type of trailer, for example, as a furniture van, which has a relatively low frame or body; trailers for motor freight; trailers with tank bodies for hauling gasoline or oil or other liquids; trailers with drop frames wherein the drop or offset varies; and frameless trailers. Obviously, such variation in semi-trailers require variation in the supports therefor. Some of the controlling factors are the height and width as well, also, as the available means to which the support may be attached.

Accordingly, semi-trailer supports have to be designed or engineered for a particular type of trailer or, in other words, designed for the job. The present invention provides a supporting structure where this can be done without, however, departing from standardized construction and manufacture. To this end, the various parts of the support are readily detachable from each other and can be assembled with other parts of different dimensions. All of the mechanical or functioning parts which may be termed wearing parts, are interchangeable with other elements of the support, and the construction makes the various elements accessible and easily serviced. For example, a leg of the support constitutes a unit which may be used with another leg and can be interchanged with brackets and braces, etc., of different dimensions. Moreover, a supporting leg is comprised of standardized parts, whose length can be changed easily by merely varying the length of an intermediate part thereof. The leg structures very largely contain the functioning or operating mechanism so that the mechanism may constitute a part of the leg unit. Furthermore, the construction is arranged so that the legs may be reversed with respect to their mounting to the semi-trailer thus adapting the structure for use with trailers having frames and with frameless trailers.

The invention also aims to provide an improved ground engaging structure comprised of a pair of ground engaging elements, such as wheels or rollers, with an improved equalizing arrangement which gives a universal action so that the two elements may adapt and adjust themselves to road irregularities. A further object is to provide an operating mechanism for raising and lowering the legs of the support by means of a selected ratio in order to provide for fast or slow movement, relatively, and to provide, where necessary, a high mechanical advantage.

These and other objects will be better understood as they are brought out in the following detailed description.

Supporting structures built in accordance with the invention are shown in the accompanying drawings.

Fig. 1 is a general elevational view with some parts cut away and other parts in section showing a support constructed in accordance with the invention.

Fig. 2 is an enlarged sectional view showing the equalizing arrangement for the ground engaging elements.

Fig. 3 is an enlarged detail view with parts in section showing the operating nut and telescoping arrangement of a supporting leg.

Fig. 4 is a sectional view taken substantially on line 4—4 of Fig. 3 showing the screw and nut adjusting means.

Fig. 5 is a composite cross sectional view taken through the leg and showing the keying arrangement and screw and nut construction.

Fig. 6 is a side elevational view of the support shown in Fig. 1.

Fig. 7 is a partial elevational view showing a modified arrangement.

Fig. 10 is a view largely in section illustrating the power transmitting means for the variable speed arrangement illustrated in Fig. 9.

Fig. 11 is a horizontal view with the casing cut away and illustrating the transmission.

Fig. 12 is a sectional view taken substantially on line 12—12 of Fig. 11.

Figure 9:
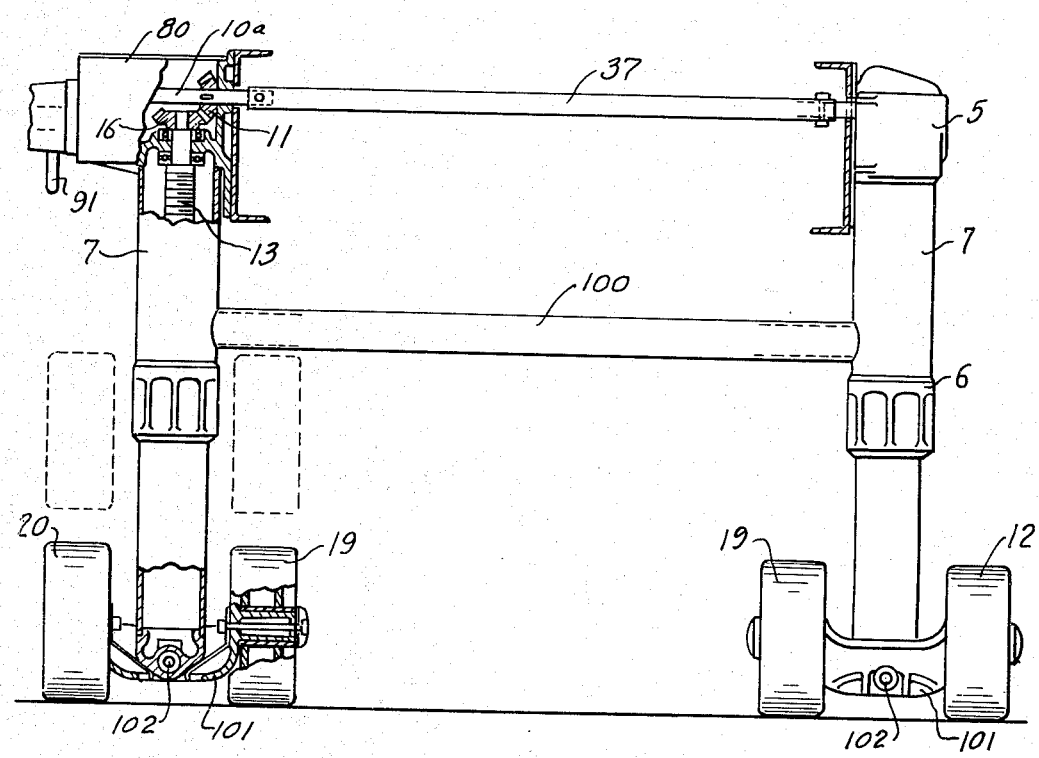
Fig. 9 is a view of a form of the invention which embodies a multiple speed control for adjusting the support.

In Fig. 1, two channel members 1 and 2 are illustrated, these representing the main frame portions of a semi-trailer and a suitable cross member of the frame is shown at 3. The legs of the support are attached to the trailer frame and as shown, one leg is attached to each frame member and the legs are positioned on the outside surfaces of the frame. Usually, the trailer body has a width considerably more than the width of the frame so that the body overhangs the supporting legs. Inasmuch as the two legs of the support are of the same construction a description of one will suffice.

The fixed portion of each leg of the support comprises three basic elements. These are the top or head piece 5, the lower end piece or sleeve 6 and an intermediate tube or pipe 7. The ends of the pipe are preferably welded to the elements 5 and 6 and the elements 5 and 6 are preferably steel castings. It will be noted that the upper end of the pipe has a telescoping fit within the head piece 5 and that the lower end of the pipe has a telescoping fit outside of the piece 6. This telescoping arrangement makes for increased strength. It will be observed, therefore, that the fixed leg portions may be easily varied as to height by the mere selection of the desired length of pipe.

The head piece 5 constitutes a housing and it has a flange 8 which is riveted, bolted or otherwise secured to the frame. Journalled in the housing on one side of the frame is a shaft 10, and mounted thereon is a gear 11 preferably in the form of a bevelled pinion. The housing has a web 12, journalled in which is a screw 13 through the means of a suitable thrust and radial bearings 14 and 15 and which are preferably antifriction bearings. Keyed to the screw is a bevelled gear 16, the teeth of which mesh with the gear 11.

As will be noted by reference to Figs. 1, 3 and 4, the screw 13 depends within the pipe 7. The adjustable part of each leg is in the form of a tube or pipe 18 which has a telescoping fit with the sleeve 6. To this end the casting 6 has an axial extent sufficient to provide the desired stability. The lower end of the adjustable section 18 is provided with suitable ground engaging devices such, for example, as the two wheels or rollers 19 and 20.

A novel arrangement is provided for establishing an operable connection between the screw 13 and the adjustable section of the leg, and this is illustrated in detail in Figs. 3 and 4. The leg section 18 is formed with two opposite openings 22 and a simple nut, preferably in the form of a forging as illustrated at 23, is positioned in these openings. It is preferable that the openings and the nut be of circular formation as shown in Fig. 3, and the end portions of the nut preferably have a nice snug fit in the openings of the tube. The nut is internally threaded for the reception of the threads on the screw 13, and to facilitate the application of the threading tool to the nut it is preferably flattened as at 24 and 25. In order to hold the nut against endwise movement, and to take the force of any such movement off the screw 13, a washer 26 is placed over the screw and it may merely rest upon the nut. This washer has a nice running fit both with the screw and with the interior of the pipe. It will be seen, therefore, that while the screw is free to rotate without disturbing the washer that any lateral movement is prevented because of the fit of the washer within the tubular leg section.

A suitable laterally extending bracket 30 is attached to one housing 5 and it supports an operating shaft 31 designed to receive an operating crank 32 arranged for manual manipulation. This crank, as illustrated at 33, may be attached to the shaft so that it may be applied thereto for turning the same or folded with respect thereto while the vehicle is in transit. When the handle is folded it may be hooked into a retaining device 34. The details of this handle mounting are simple and insofar as this invention is concerned needs no further description. The shaft 31 and shaft 10 are coupled together as at 35. It will be apparent that turning of the crank causes a rotation of the screw and a reciprocal movement of the adjustable section of the leg. As shown by full lines in Fig. 1, the legs are in extended or supporting position; the dotted lines show one leg substantially in fully elevated or retracted position.

The leg on the opposite side of the vehicle, as above mentioned, is of the same construction except that the operating shaft 10 and operating crank structure is not applied to the upper housing. There is a cross shaft 37 coupled to the shaft 10 as illustrated, and to a stub shaft 38 in the housing at the opposite side of the trailer. On this stub shaft is a bevelled gear 11, the teeth of which mesh with a bevelled gear 16 for operating the shaft 13 in that leg.

Suitable bracing elements are preferably employed. An important bracing element is the rearwardly extending angular brace illustrated in Fig. 6. This is in the form of a tube 40 provided with a bracket 41 at one end for attachment to the frame and secured at its opposite end to the intermediate casting 6. For this purpose the casting 6 preferably has a boss 42 for receiving the angular support 40. It will be observed that this angle construction may be easily varied as to length to accommodate the structure in different assemblies.

Other supports are illustrated in Fig. 1, such as the angular cross supports 45 and 46. The same bracket may be employed for these supports as the support shown in Fig. 6, the brackets 41 being attached to the frame cross piece 3. The supports 45 and 46 may be provided with a suitable clevis arrangement 47 for attachment to lugs 48 on the castings 6. As shown in Fig. 1 there is also a transverse support 49 directly connecting the castings 6. It will be noted that this construction is flexible in that various lengths of supports may be provided by different lengths of tubular members. Moreover, in some cases, some of these cross supports may be dispensed with as, for example, as illustrated in Fig. 7, where there is a cross support 50. In this form the support 50 is a tube, the ends of which are mounted in fittings 51 secured to the leg section 7 preferably by welding.

Key means is provided for keying the two leg sections together against rotation yet permitting relative axial movement. This construction is shown in Figs. 3 and 5. The boss 42 of the casting 6 is provided with a portion 53 which is internally threaded for the reception of a nut 54. This nut has a partly spherical recess in it for the reception of a ball 55 and the tubular leg section 18 has a groove 56 for the ball. Thus, there is a rolling action when the leg sections are reciprocated relative to each other to facilitate ease of movement. The nut is preferably provided with two cross slots positioned at 90° to each other, as illustrated, for the reception of a key 57. This nut may be adjusted to accommodate for wear and it may be adjusted in increments of 90°.

The equalizing arrangement for the ground engaging wheels is illustrated in Figs. 1 and 2. A housing member 60 is welded to the lower end of the tube 18 and detachably secured to the housing member is a cap 61. The housing member and cap provide a casing or housing for a body of resilient material, such as a block of rubber 62. This block of rubber is preferably formed so as to leave voids or spaces 63 thus providing space into which the rubber may flow when flexed. The block may be natural or synthetic rubber. There is an axle, advantageously in the form of a tube as illustrated at 65, which extends through the housing and through the rubber block and the wheels 19 and 20 are mounted on this axle through the means of their hubs or bushings 66. The axle has a clearance as at 67 with the housing but is snugly engaged by the rubber block. The exterior surface of the housing around the clearance apertures 67 is of partly spherical formation as shown at 68 and washer-like caps 69 engage the spherical surfaces and thus close the apertures to keep out dust, dirt and other extraneous material. The parts are held in assembly by a bolt 70 which extends through the tubular axle. A sort of washer or hub cap 71 is engaged by the head of the bolt and a similar washer or hub piece 72 is engaged by the nut on the opposite end of the bolt and when the nut is tightened the hub pieces 71 and 72 draw the bushings 66 together so that they press the washers 69 against the spherical surfaces 68.

Thus, it will be seen that the entire axle structure and the tube ground engaging wheels 19 and 20 are mounted in rubber and that there is a limited amount of universal movement in any direction substantially about the center of the housing formed by the housing member 60 and cap 61. The rubber block is normally tightly engaged within the housing and it snugly engages the axle 65. Under normal conditions the parts take a position as substantially illustrated in Figs. 1 and 2. Irregularities in the roadway, however, may cause a tipping or angular disposition of the axle which is permitted by the resilience of the rubber which, when subjected to such forces may change its shape and flow into the spaces 63.

Figure 8:
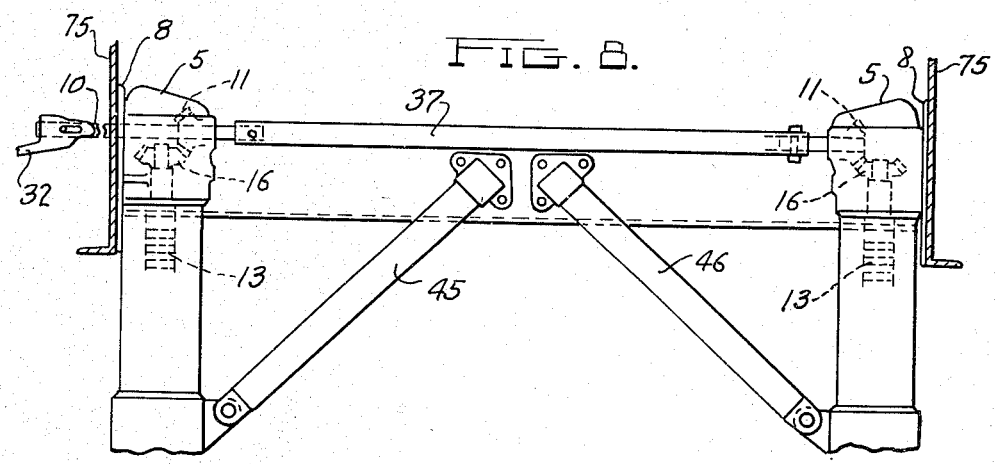
Fig. 8 is a partial elevational view illustrating the support adapted to a frameless-type of trailer.

In the modified arrangement shown in Fig. 8, the structure above described is applied to a frameless-type of vehicle body wherein the sides of the body, as illustrated at 75, are spaced apart a greater distance than the frame element 1 and 2. This is accomplished by reversing the position of the supports. In this connection, the housing elements 5 have their flanges 8 facing outwardly and they lie against the inside faces of the trailer body parts 75. The structure is otherwise the same and the same reference characters are applied. It will be noted, however, that due to the increased width of the construction shown in Fig. 8, that the extending bracket 30 and associated parts need not be employed. To the contrary, the handle 32 may be applied directly to the shaft 10. This construction may require longer angle braces 45 and 46. Also note, in Fig. 8, that the cross brace as illustrated at 49 in Fig. 1 is not employed. This has nothing to do particularly with the fact that Fig. 8 shows a frameless trailer but illustrates how the support may be used without such a cross brace.

In Figs. 9 to 12, a form is shown where different speeds in the control is provided. For the most part, the supporting structure is the same as that above described and like parts bear the like reference characters. In this form, however, the head or top casting construction of one leg is varied as illustrated at 80, and it provides a housing or case for a gear change transmission. The output shaft of the transmission is illustrated at 10a and the drive pinions may be the same as those previously described and have the same reference characters, namely, 11 and 16 applied thereto.

As shown in Fig. 11 the output shaft has two gears thereon which may be constructed as a gear cluster, one gear being illustrated at 81 and the other at 82. The input shaft or drive shaft is illustrated at 84. It is journalled in the housing in a position preferably displaced from the horizontal plane of shaft 10a to reduce the width of the transmission, and on the shaft 84 is a gear 85 for mating the gear 82 and a gear 86 for mating with gear 81. A suitable bracket 87 may be attached to the housing for supporting the crank shaft 88 associated with a suitable crank 89.

A shifter control shaft 90, formed with a handle 91, is slidably mounted in the housing and it has a yoke 92 which engages over the gear 85. In the position shown in Fig. 11, the larger gear 85 has its teeth in mesh with a smaller gear 82 on the shaft 10a. By shifting the rod 90 to the left as the figure is viewed, or to substantially the dotted line position, the gears 82 and 85 are moved out of mesh and the gears 86 and 81 are moved into mesh. For this purpose, the gears 85 and 86 are slidably keyed to the input shaft 84 and may be formed as a single gear cluster. Indeed, gears 81 and 82 may be formed as a cluster. The shaft 90 is to be held in adjusted position for which purposes it is provided with two grooves 95 and 96 for cooperation with a spring pressed ball detent 97. This detent arrangement holds the shaft in the two positions with the gears in mesh. In an intermediate position the transmission may be in neutral. Where the gear shift transmission arrangement is to be employed with a frameless trailer, as illustrated in Fig. 8, the shaft 90 is reversed so that the handle is positioned opposite that shown in Fig. 11, and the detent arrangement will be set up to hold the gears in proper position.

In the operation of this construction, the movement of the adjustable portions of the support may be given a relatively fast or a relatively slow action. The fast or high gear position is shown in Fig. 11. For example, the supports may be lowered from their upper position with the fast action. After the wheels strike the ground it may be desirable to provide a slight elevating movement for the trailer frame and for this purpose the transmission may be shifted to the low gear position with the gear 86 in mesh with the gear 81. In elevating the support the fast or slow action may be used and this may be determined by the particular operator.

Also, Fig. 9 is a varied construction wherein a cross brace 100 is welded to the fixed tubular leg sections 7. In addition, the ground engaging wheels 19 and 20 are journalled on a saddle structure 101. This saddle structure has a pivotal connection 102 with the lower end of the support leg. It will be noted that this pivotal connection is depressed or lowered. In this connection this form of ground engaging wheel arrangement may be used with a drop frame trailer; that is, where the frame of the trailer drops or bends down from the elevation at the tractor to a location closer to the ground. However, either form of ground engaging wheel mounting may be used in any form of the leg construction.

I claim:

1. In a support for a semi-trailer, a hollow upper leg section fixedly secured to the semi-trailer and depending therefrom, an adjustable lower leg Section having telescoping engagement with the fixed leg section and having ground engaging means at its lower end, a screw depending within a hollow fixed leg section, operating means for turning the screw, the adjustable leg section being in the form of a tube, said tube having oppositely disposed apertures therein, a internally threaded nut extending across the interior of the hollow tube and having its end portions situated in said apertures, the nut being in threaded engagement with the screw, and a loose washer-like member resting upon the nut and through which the screw passes, said washer-like member having an operating clearance with respect to the screw and with respect to the inner wall surfaces of the hollow leg section to thereby hold the nut and screw against lateral displacement.

2. In a support for a semi-trailer, a fixed leg section secured to the semi-trailer and depending therefrom, an adjustable leg section telescopingly interfitted with the fixed leg section, means for shifting the adjustable leg section to raise and lower the same, said adjustable leg section having ground engaging means on its lower end, the adjustable leg section having a lengthwise extending exterior groove, a boss carried by the fixed leg section, said boss having an internally threaded aperture, a nut positioned in said aperture, said nut having a partly spherical recess, a ball positioned in said recess and engaging in the groove of the adjustable leg section to key the leg sections together and provide a substantially anti-friction action in their relative movement, and means for holding the nut in adjusted position in the threaded aperture.

3. In a support for a semi-trailer, a supporting leg operable for movement to and from supporting position, ground engaging means on the lower end of the supporting leg comprising, a housing on the lower end of the leg, a block of rubber positioned in said housing and having an aperture extending therethrough, an axle extending through the said aperture and engaged by the rubber block, a ground engaging element positioned at opposite ends of the axle, the housing having enlarged apertures providing a clearance relative to the axle whereby the axle may shift angularly for adjustment of the elements to ground irregularities, the exterior surfaces of the housing around said apertures being substantially of a section of a sphere, and a washer-like member on the axle adjacent each aperture and having a recessed face formed substantially as a section of a sphere for engaging the adjacent surface of the housing to close the aperture.

4. In a support for a semi-trailer, a supporting leg operable for movement to and from supporting position, ground engaging means on the lower end of the supporting leg comprising, a housing on the lower end of the leg, a block of rubber positioned in said housing and having an aperture extending therethrough, an axle extending through the said aperture and engaged by the rubber block, a ground engaging element positioned at opposite ends of the axle, the housing having enlarged apertures providing a clearance relative to the axle whereby the axle may shift angularly for adjustment of the elements to ground irregularities, the exterior surfaces of the housing around said apertures being substantially of a section of a sphere, and a washer-like member on the axle adjacent each aperture and having a recessed face formed substantially as a section of a sphere for engaging the adjacent surface of the housing to close the aperture, said housing and rubber block being so relatively formed so as to provide clearance spaces for the flow of rubber thereinto when flexed by tipping of the axle.

5. In a support for a semi-trailer, a supporting leg operable for movement to and from supporting position, ground engaging means on the lower end of the supporting leg comprising, a housing on the lower end of the leg, a rubber block positioned in the housing and having an aperture therethrough, a tubular axle extending through said aperture, the housing having relatively enlarged apertures to provide a clearance relative to the axle, the exterior surface of the housing around each aperture being formed as a part of the sphere, a wheel on each end of the axle, each wheel having a hub, a washer positioned between each wheel hub and said housing end tightly engaging the axle, each of said washers having a concaved surface of partly spherical form for engaging the exterior surface of the housing to close the apertures in the housing, and securing means extending through the hollow axle and engaging the outside portions of each wheel to hold the wheels on the axle and to hold the hubs thereof against said washers whereby the washers are held in engagement with the housing.

6. In a support for a semi-trailer, a leg structure comprising, a fixed leg section, said fixed leg section having an upper housing part in the form of a casting adapted to be secured to the semi-trailer, a lower sleeve part in the form of a casting having axially spaced internal bearing surfaces located respectively adjacent opposite ends of the sleeve part, a tubular intermediate part having its ends secured to said upper and lower parts, a tubular adjustable leg section, said adjustable leg section being telescopingly received in and having a sliding relationship with said internal bearing surfaces of the lower sleeve part and said adjustable leg section adapted to telescope within the tubular intermediate part of the fixed leg section and having clearance with respect to the interior wall surfaces of the intermediate tubular part, a screw depending within the fixed leg section, means within the housing part for turning the screw, a nut carried by the adjustable leg section which is internally threaded and in engagement with the screw and ground engaging means on the lower end of the adjustable leg section.

CARL G. SEYFERTH.

REFERENCES CITED

The following references are of record in the file of this patent:

UNITED STATES PATENTS

| Number | Name | Date |
|---|---|---|
| 851,728 | Bayrer | Apr. 30, 1907 |
| 1,148,795 | Pearson | Aug. 3, 1915 |
| 1,173,964 | Herman | Feb. 29, 1916 |
| 1,347,006 | Boas | July 20, 1920 |
| 1,770,572 | Fruehauf et al. | July 15, 1930 |
| 2,039,153 | Edwards | Apr. 28, 1936 |
| 2,086,557 | Kaptuller | July 13, 1937 |
| 2,122,066 | Kaptuller | June 28, 1938 |
| 2,232,187 | Reid | Feb. 18, 1941 |
| 2,233,135 | Ketel | Feb. 25, 1941 |
| 2,347,921 | Miller | May 2, 1944 |
| 2,358,488 | Black | Sept. 19, 1944 |